July 17, 1962   I. M. LEVY ET AL   3,045,159
ELECTRIC MOTOR STARTING CIRCUITS
Original Filed Aug. 27, 1956
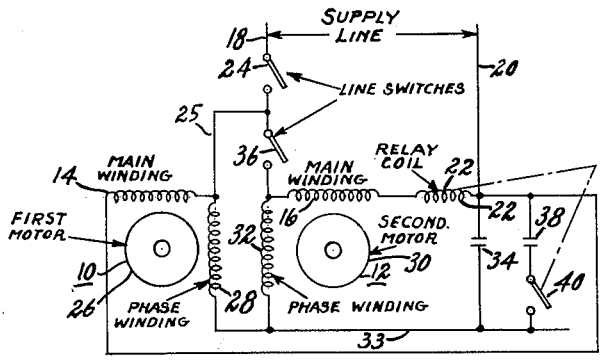
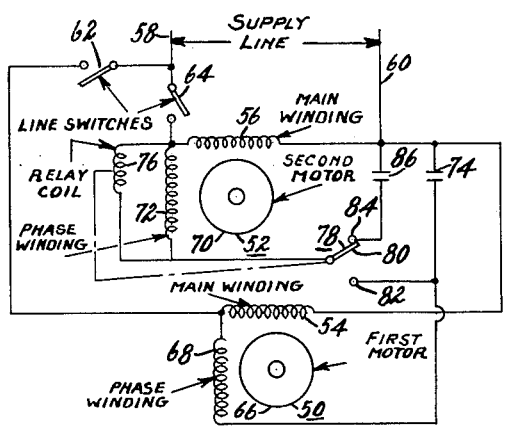
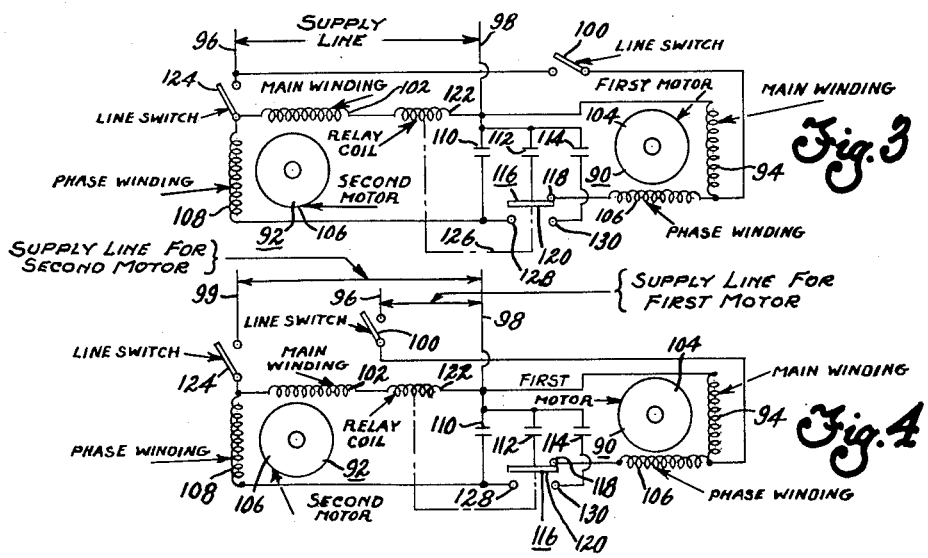
INVENTORS
IRVING M. LEVY
ROBERT W. LELAND
BY
D. C. Staley
THEIR ATTORNEY United States Patent Office 3,045,159
Patented July 17, 1962

3,045,159
ELECTRIC MOTOR STARTING CIRCUITS
Irving M. Levy and Robert W. Leland, Dayton, Ohio, assignors to General Motors Corporation, Detroit, Mich., a corporation of Delaware
Original application Aug. 27, 1956, Ser. No. 606,279. Divided and this application Apr. 22, 1959, Ser. No. 808,353
4 Claims. (Cl. 318—103)

This invention relates to starting circuits for electric motor systems and particularly to systems for starting and running several capacitor motors with a reduced number of capacitors.

This is a divisional application of copending application S.N. 606,279, filed August 27, 1956, now abandoned.

On some motor applications several motors are required. Generally, each of the motors is started separately and operated independently of other motors on the system. When capacitor motors are used, each employing its own capacitors, the number of capacitors required are appreciable in size and cost. A saving in the number of such capacitors used is desirable on mass-produced units such as for circuits embodying both a fan and compressor motor on refrigerators and air conditioners.

An object of this invention is to provide a circuit wherein two or more motors are so interconnected that a portion of the capacitors used is common to all motors during a part of the operating cycle of the usually independently operable motors.

Another object of this invention is to provide a circuit wherein independently operable capacitor motors utilize combined running capacitance after running speed is attained by progressively started motors in the system.

Another object is to provide for starting of several capacitor motors with a minimum number of capacitors while providing improved power factor by balancing lagging currents due to inductive reactances of the motors with leading current of capacitive reactances used in starting and/or running of the motors.

Another object is to provide a capacitor-start capacitor-run circuit for starting electric motors in which one motor can be started and run as a permanent split capacitor motor but will continue to run as a split-phase motor while the phase winding circuit thereof is opened for starting the second motor as capacitor-start with a reversion to capacitor-run for both motors at a predetermined speed sensed by a switch or relay.

Another object is to provide a circuit for operating a motor as a capacitor-run motor when operating by itself but switching the running capacitor over to include in the circuit a second motor thereby paralleling phase windings of each motor relative to the other using a capacitance in series with the paralleled phase windings for a saving in the capacitor size and cost necessary if each motor were operated independently.

Further objects and advantages of the present invention will be apparent from the following description, reference being had to the accompanying drawings wherein preferred embodiments of the present invention are clearly shown.

In the drawings:

FIGURE 1 discloses one embodiment of a circuit employing the present invention wherein two motors which when both in the circuit have their phase windings connected in parallel while a common capacitance connected in series with the paralleled phase windings is shared to operate the motors.

FIGURE 2 illustrates another embodiment wherein the circuit of FIGURE 1 is modified to show another form of the invention.

FIGURE 3 discloses an embodiment of the present invention wherein a first motor can be started and run as a permanent split capacitor motor but continues to run as a split phase motor while the second motor is connected with paralleled capacitors for starting using the same supply voltage for both motors.

FIGURE 4 discloses an embodiment substantially like that of FIGURE 3 except that the first motor is operable from one supply voltage and the second motor is connected to a different supply voltage.

The aforementioned and other objects are accomplished by the present invention in a dual motor starting circuit using a reduced number of capacitors for starting of several capacitor motors. Although the invention as disclosed in the present embodiments is not limited to refrigerating apparatus or air conditioners, the circuits are particularly adapted to such use. It is to be understood that the first motor could then have one horsepower rating such as a fan motor while the second motor could have a different horsepower rating such as a compressor motor. However, the invention could also be used where both the first and second motors have the same horsepower rating.

With particular reference to FIGURE 1, a circuit diagram of the first embodiment of the present invention shows a first motor 10 and a second motor 12. The motor 10 has a main or running winding 14 and the motor 12 likewise has a main or running winding 16. The main winding 14 of motor 10 is connected across power supply line leads 18 and 20. The main winding 16 of motor 12 may be connected across the power supply line 18 and 20 or connected in series with a current relay coil 22 of a relay means across the power supply line 18 and 20. A main control switch 24 may be provided in one of the power lines to control the power supply circuit to both of the motors. Switch 24 may also be placed in a lead 25 to the first motor so that the two motors may be individually connected to line 18. The first motor 10 has a rotor 26 and a phase or auxiliary winding 28. The other motor 12 has a rotor 30 and a phase or auxiliary winding 32. Each of these phase windings is connected at one end to a common lead 33 in series with a first capacitor 34 across the power line leads 18—20. This capacitor 34 serves as a common running capacitor for each motor. If a secondary line switch 36 is used, this switch must be closed before the second motor is connected across the line. When a current operated magnetic relay is used, switch 36 effects connection of relay coil 22 into the circuit.

In FIGURE 1, in addition to the capacitor 34, there is a second capacitor 38 in series with a switch 40 which may be operated by a relay coil 22. The relay closes the contacts of the normally open switch 40 to connect the capacitance 38 in parallel across capacitance 34 for greater necessary starting torque of the second motor. The additional starting torque is used in starting the second motor after the first capacitor 34 has started the first motor 10 upon closing of line switch 24. The second motor may be larger and more difficult to start than the first motor and therefore may require the added capacitance to provide added starting torque.

In operation of the circuits of FIGURE 1, when the secondary line switch 36 is closed, current flows in the main and phase windings of the second motor 12 and the initial surge of current in relay coil 22 actuates the switch, 40, closing the circuit with a parallel arrangement of capacitor 34 and capacitor 38 to provide the necessary increased starting torque mentioned. As the second motor 12 attains its operating speed, the current in relay winding 22 decreases until the normally open switch 40, closed thereby, automatically reopens. Then the capacitor 34 used initially with the first motor 10 becomes the running capacitor in series with the paralleled phase windings 28 and 32 of motors 10 and 12, respectively. It is to be understood that a potential relay or other suitable means to operate switch 40 can be used in place of the current relay shown in FIGURE 1 without departing from the principle of the present invention.

FIGURE 2 is a diagram of another embodiment of this invention. In this case the starting capacitance of the second motor is in series with the phase or auxiliary winding of this motor only. A first motor represented by the numeral 50 and a second motor represented by the numeral 52 have main windings 54 and 56, respectively. The main winding 54 for the first motor 50 is connectible across the power supply line leads 58 and 60 by means of a first line switch 62. The main winding 56 of the second motor is connectible across the power line leads 58—60 by means of a secondary line switch 64. The first motor 50 has a rotor 66 and a phase, or auxiliary winding 68. The second motor 52 has a rotor 70 and a phase or auxiliary winding 72. Closing the first power switch 62 connects the main winding 54 of motor 50 across the line in parallel with the phase winding 68 which is series-connected to a capacitor 74 for the first motor 50. The phase winding 72 of the second motor 52 may have a potential relay coil 76 connected in parallel therewith responding to voltage drop or potential across winding 72. If a potential relay is used, the relay coil 76 controls a relay contact switch 78 to connect a switch arm carrying a movable contact 80 between fixed contacts 82 and 84. The switch contact is normally closed with contacts 80 and 84 closing a circuit with a capacitance 86 in series with the auxiliary winding 72. It is understood that means other than the potential relay may be used to actuate switch arm 78. The capacitor 86 serves as the starting capacitor connected in series with the phase winding 72 for motor 52. Closing of switch 64 connects the second motor across the supply line. If a potential relay is employed, there will be an increase in voltage across the potential relay coil 76 as motor 52 approaches operating speed. Then the relay switch 78 is energized sufficiently to close contacts 80—82 by the increased voltage on relay coil 76 leaving its normally closed position connecting contacts 80 and 84 with capacitor 86 as a starting capacitor shown in FIGURE 2 and utilizing capacitor 74 as a running capacitor.

It will be noted that capacitor 74 is permanently connected in series with the phase winding of the first motor when the second motor is not connected to the power supply line. When the second motor has been started and switch 78 is operated to close contacts 80 and 82, capacitor 74 is then connected in series with the parallel circuit of the phase windings of both motors and serves as a running capacitor for each motor.

FIGURE 3 shows a third embodiment of a circuit in which a portion of starting capacitance of one motor is used as the running capacitance for another motor. In this embodiment, a first motor generally indicated by the number 90 and a second motor 92 are connected so that the running capacitance of the first motor serves as a part of the starting capacitance of the second motor during its starting cycle. The motor 90 has a main winding 94, and is connectible across power line leads 96 and 98 by means of a first line switch 100. The second motor 92 has a main winding 102 and is connectible across the same line leads 96—98 by another line switch 124. The first motor 90 has a rotor 104 and phase of auxiliary winding 106. The second motor 92 has a rotor 106 and phase or auxiliary winding 108. The phase winding 108 of the second motor 92 is capable of being connected in series with a multi-portion capacitor means or plurality of parallel-connected capacitors 110, 112, and 114. Capacitor 112 may be termed a first portion of capacitance 110, 112, and 114 with capacitors 110 and 114 being called second or additional portions thereof. The capacitance 112 is originally in series with the phase winding 106 of the first motor 90 through a relay switch 116 normally in a closed position with contact 118 and the movable contact 120 of the switch 116. Thus the first motor 90 is started when line switch 100 is closed across power line leads 96—98. Capacitance 112 serves as the starting and running capacitance for the first motor 90. A current relay coil 122 may be used connected in series with the main winding 102 of the second motor 92. This circuit is energized from the power line leads 96—98 when line switch 124 is closed. If a current relay is used as the switching means, its coil 122 has an operative relation with the relay switch 116 as indicated by the broken line 126 so that the initial current through the main winding 102 and 122 actuates the relay to move the movable contact 120 of switch 116 across contacts 128 and 130 connecting the capacitors 110 and 114 in parallel with capacitance 112. This parallel capacitor arrangement is now connected in series with the phase winding 108 of the second motor 92 such that capacitors 110, 112, and 114 provide starting capacitance sufficiently large to provide the necessary starting torque for the second motor 92. During the time that the capacitances 110, 112, and 114 are being used as the starting capacitances of the second motor 92, the capacitance 112 is disconnected from the phase winding 106 of the first motor 90. Thus, during the capacitor starting of the second motor 92, the first motor 90 temporarily runs as a split phase motor until the switch 116 reverts to its normal position connecting the capacitance 112 with the phase winding 106 of the first or fan motor 90 to become the running capacitance of the first motor 90. When relay switch 116 returns to its normally closed position connecting contacts 118 and 120 as shown in FIGURE 3, the second motor has attained an operating speed and the capacitance 110 initially used as a portion of the starting capacitance for the second motor 92 becomes the running capacitance for this motor also. It is understood that although a current relay is shown, other switching means may be employed.

The fourth embodiment shown in FIGURE 4 employs the same connections and windings shown in FIGURE 3. The windings and capacitances are denoted with the same reference numerals applied in FIGURE 3 except where the first motor 90 is connected by line switch 100 to a source of different voltage value than that of motor 106. An additional supply line lead 99 is shown to serve this purpose. Switches 100 and 124 are then connected in supply line leads 96 and 99, respectively, as shown.

It is understood that relay coils used in each of the four embodiments may be replaced by other switching means without departing from the essence of the present invention. Also, although only two motors are shown, it is to be understood that several motors could be used.

The advantage of having capacitor-start capacitor-run motors is realized in each of the starting circuits shown in the accompanying disclosure. Thus an improved power factor due to capacitive reactances in circuits with the inductive reactances of the motors, is obtained in the circuits of the present invention.

While the embodiments of the present invention as herein disclosed constitute preferred embodiments, it is to be understood that other forms might be adopted.

What is claimed is as follows:

1. A circuit wherein first and second motors are so interconnected that a portion of capacitance used in starting and running is common to independently operable motors during part of the operating cycle, comprising, in combination, a power supply source, a first capacitor motor operable from said source and having main and phase windings, a second capacitor motor also operable from said source and having main and phase windings, a capacitance portion series-connected to provide phase shift of operating current flow through said first motor phase windings, and switching means for temporarily connecting said capacitance portion in parallel with a capacitance in the circuit of the second motor and additional starting capacitance for starting said second motor, said switching means returning said capacitance portion into series connection with said first motor as running capacitance and opening the circuit of the additional starting capacitance after being used in common with said second motor during part of the operating cycle.

2. A capacitor-start capacitor-run dual electric motor starting and running circuit comprising, a power supply source, a multi-portion multi-purpose capacitive impedance connected at one side to said source, a first capacitor motor operable from said source and having main and phase windings, the phase winding of said first motor being adapted to have a connection in series with a first portion of said capacitive impedance individually across said source, a second capacitor motor operable from said source and having main and phase windings, the phase winding of said second motor being adapted to be connected and operable in series with a second portion of said capacitive impedance across said source, and a switching means such as a relay means having a coil operatively connected with said second motor, said relay means being capable of temporarily cutting off the first portion of said capacitive impedances from said first motor to connect an additional portion of said capacitive impedance in parallel with the second portion of said capacitive impedance for starting said second motor, said first motor having the phase winding thereof temporarily opened by said relay means but continuing operable as a split phase motor until said second motor attains operating speed, the first portion of said capacitive impedance then becoming the running capacitance of said first motor as said switching means returns to normal positioning.

3. A capacitor-start capacitor-run dual electric motor starting and running circuit for refrigerating apparatus, comprising, a power supply source, a multi-portion multi-purpose capacitive impedance connected at one side to said source, a capacitor-type fan motor operable from said source and having main and phase windings, the phase winding of said fan motor being adapted to be connected in series with a first portion of said capacitive impedance across said source for the purpose of starting operation, a capacitor-type compressor motor operable from said source and having main and phase windings, the phase winding of said compressor motor being adapted to be connected in series with a second portion of said capacitive impedance across said source, and a capacitor switching means operably connected with the windings of said compressor motor capable of temporarily cutting off the first portion of said capacitive impedance from said fan motor and thereby connecting an additional portion of said capacitive impedance in parallel with the second portion of said capactive impedance for starting said compressor motor, said fan motor having the phase winding thereof temporarily opened by said switching means but continuing operable as a split phase motor until said compressor motor attains operating speed with said switching means then reverting to normal positioning connecting the first portion of said capacitive impedance with said fan motor for capacitor-run operation.

4. A capacitor-start capacitor-run dual electric motor starting and running circuit comprising, first and second capacitor motors having main and phase windings, first and second supply line sources adapted to be connected to operate said first and second motors respectively, a multi-portion capacitive impedance connected at one side to said source, the phase winding of said first motor being adapted to be connected and operable in series with a first portion of said capacitive impedance for phase shift of current therethrough to lead current in the main winding thereof together across said first source, the phase winding of said second motor being adapted to be connected and operable in series with a second portion of said capacitive impedance across said second source, and a switching means operatively connected with said second motor, said switching means being capable of temporarily cutting off the first portion of said capacitive impedance from said first motor to connect an additional portion of said capacitive impedance in parallel with the first portion of said capacitive impedance for starting said second motor, said first motor having the phase winding thereof temporarily opened by said switching means but continuing operable as a split phase motor until said second motor attains operating speed, the first portion of said capacitive impedance then becoming the running capacitance of said first motor as said switching means returns to normal positioning.

References Cited in the file of this patent
UNITED STATES PATENTS 2,782,351  Suhr _____ Feb. 19, 1957